Feb. 2, 1937.   A. I. KIRKLAND   2,069,527
CHUCK ADAPTED FOR STUD DRIVER OR THE LIKE
Filed Feb. 8, 1935   2 Sheets-Sheet 2
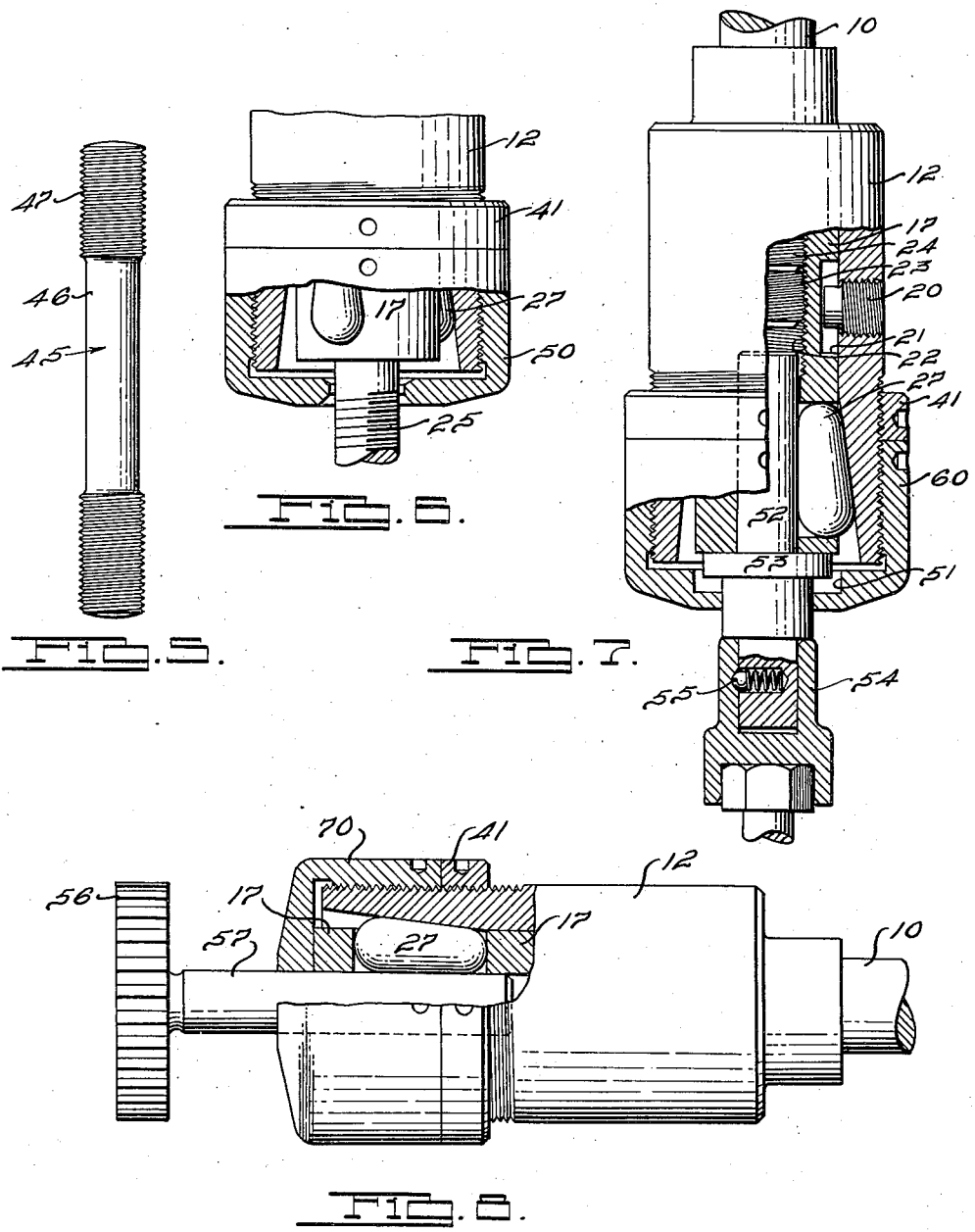
INVENTOR
Arthur I. Kirkland
BY
Harness, Dickey, Pierce & Hann.
ATTORNEYS.

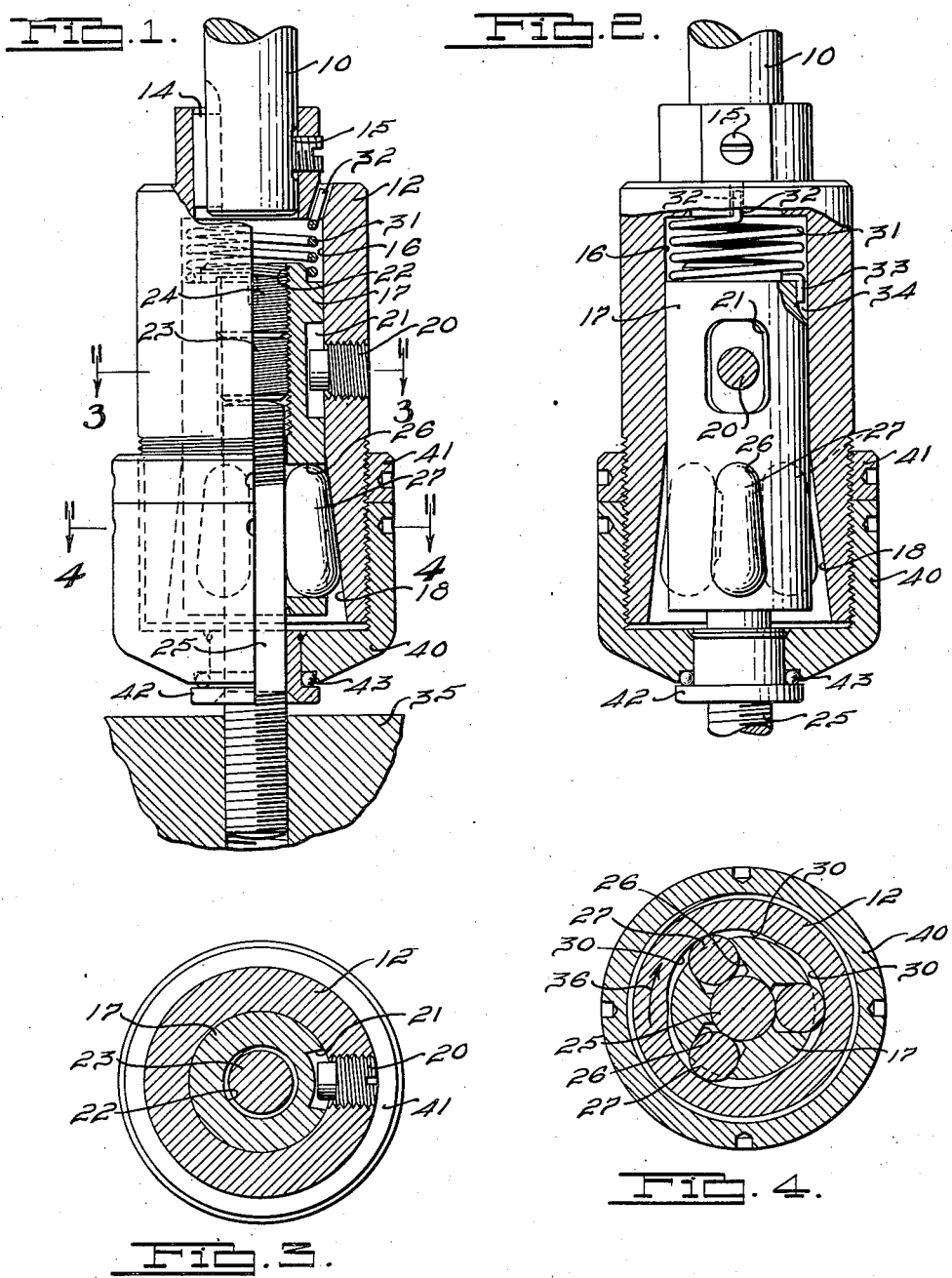

Patented Feb. 2, 1937

2,069,527

UNITED STATES PATENT OFFICE 2,069,527

CHUCK ADAPTED FOR STUD DRIVER OR THE LIKE

Arthur I. Kirkland, Detroit, Mich.

Application February 8, 1935, Serial No. 5,595

11 Claims. (Cl. 81—53)

This invention relates to chucks and more especially to chucks adapted to turn in or out the studs which secure removable cylinder heads to the cylinder blocks of internal combustion engines and to perform similar rotary driving and withdrawing operations.

One of the main objects of the invention is to provide a reversible chuck adapted to turn a stud, or the like, in either direction simply by reversing the direction of rotation of the drive for the chuck.

Another object is to provide a reversible chuck for driving studs, or the like, by gripping unthreaded portions of such studs.

A further object is to provide an automatically releasable chuck which will not mar, scratch, or otherwise injure the part into which a stud, or the like, is turned.

A further object is to provide a stud driving chuck of the above character which is adaptable to different sized studs.

A further object is to provide an automatically releasable chuck which will not injure the part into which a stud is turned and in which provision is made for compensating for wear of chuck parts.

A further object is to provide in an automatically releasable stud driving chuck for adjustably maintaining the desired height of setting of the stud.

It is also an object of the invention to provide a reversible and automatically releasable stud driving and removing chuck which is adapted to grip unthreaded portions of the stud and in which the unthreaded portions of such stud are of a reduced diameter as compared with the threaded end portions thereof.

Another object is to provide a chuck of the above character which is also adapted to a wide variety of other uses.

Other objects, features and advantages will become apparent from the following description and appended claims.

For the purpose of illustrating the genus of the invention, various concrete embodiments are shown in the accompanying drawings, in which:

Figure 1 is a side elevation, parts being broken away and shown in section, of a chuck constructed in accordance with the principles of this invention;

Fig. 2 is a similar view of the mechanism shown in Fig. 1, the view, however, being taken at an angle of 90 degrees with reference to the view in Fig. 1;

Figs. 3 and 4 are sections taken on the lines 3—3 and 4—4 of Fig. 1;

Fig. 5 is an elevation of a stud provided with an unthreaded portion of a reduced diameter, which stud may be applied to and removed from a cylinder block, or the like, by means of the present construction;

Fig. 6 is a fragmentary view similar to Figs. 1 and 2 of a modified form of end construction of a stud operating chuck;

Fig. 7 is a view similar to Fig. 1, showing the chuck construction as modified for use in driving nuts, and the like, with a power driven unit; and Fig. 8 is a similar view depicting a further adaptation of the chuck construction for driving milling cutters, drills, reamers, counter-bores, taps, and the like, by means of a power driven unit.

Referring to the drawings and more especially to Figs. 1 to 4, inclusive, the numeral 10 designates a driving adapter or shank adapted in turn to be driven by means of a compressed air or electric drill motor, not shown, or by any other suitable source of power. The outer end of the shank 10 is non-rotataby connected to the body 12 of the chuck, hereinafter referred to as the driving member 12. The shank 10 and body or driving member 12 may be connected by means of a slot and key connection 14 and a set screw and flat connection, indicated at 15. The body or driving member 12 is provided with an axial bore 16 in which a core member 17 is reciprocably mounted. The end of the bore 16, opposite the shank, is tapered outwardly as indicated at 18 in Figs. 1 and 2. The driving member 12 and the core member 17 are preferably of cylindrical formation and are connected by means of a screw 20 and slot 21 so that there can be relative axial and rotary movements between the driving and core members. As will be noted from an inspection of Figs. 1, 2, and 3, the slot 21 and screw 20 limit both the axial and rotary movements of the driving and core members relative to each other. The core member 17 is provided with a threaded axial bore 22 in which are mounted screw plugs 23 and 24, the plug 23 serving as an adjustable stop adapted to engage the end of a stud 25 and the plug 24 serving to lock the plug 23 in its adjusted position within the core member 17.

Referring more especially to Figs. 1, 2, and 4, it will be noted that the outer end of the core member 17 is provided with three axially directed slots 26 extending therethrough and in which rollers 27 are disposed. The rollers 27 are tapered from end to end so as to contact over substantially their full length with the tapered or outwardly flared surface 18 of the driving member 12. As will be noted from Fig. 4, the outwardly flared portion 18 of the driving member 12 is further provided with cam surfaces 30 which diverge radially outwardly to the maximum extent at the central portion of each cam surface. When the chuck is lowered over a stud 25 with the upper end of the stud abutting the adjustable stop plug 23, this elevates the core member 17 to bring the rollers 27 into contact with the cam surfaces 30. The cam surfaces 30 on the driving member 12 curve radially inwardly with reference to the rollers 27 when the latter are centrally positioned with respect to such cam surfaces so that movement of the driving member in a rotary direction either to the right or to the left relative to the rollers 27 will move these rollers inwardly against the studs 25.

It will be noted from Figs. 1 and 2 that a helical spring 31 is disposed between the driving member 12 and the upper or inner end of the core member 17. One end 32 of the spring 31 is anchored in a suitable opening in the driving member 12 while the other end 33 of the spring is anchored in a suitable slot-like opening 34 in the core member 17. The spring 31 is compressed when assembled in position so that it normally urges the core member 17 outwardly with reference to the driving member 12 so that the screw stop 20 is normally disposed in the upper or inner end of the slot 21 when the chuck is not engaged to a stud 25, or the like. The spring 31 also acts in torsion so as to tend to maintain the stop screws 20 in a central rotative position with reference to the slot 21 and thus to maintain the rollers 27 centrally disposed with reference to the cam surfaces 30 of the tapered portion 18 of the bore 16.

To operate the chuck in order to turn a stud 25 with right hand threads into a suitable opening provided in a cylinder block 35, the chuck, while being rotated in a clockwise direction, as viewed in Fig. 4, by means of the drive shank 10, is brought down over the stud 25, the upper end of the stud abutting against the adjustable stop plug 23 and elevating the core member 17 together with the rollers 27 until the latter contact the cam surfaces 30 of the outwardly flared bore 18. The spring 31 has up to this time maintained the core member 17 and the rollers 27 in a lowered position with respect to the driving member 12 so that the rollers were out of contact with the cam surfaces 30 and free to move radially outwardly so that they would not exert any frictional gripping action upon the stud 25. However, as the upper end of the stud 25 causes elevation of the adjustable plug 23 and the core member 17, the rollers 27 are brought into contact with the cam surfaces 30 to cause initial frictional engagement therebetween. Since the driving member 12 is being rotated in a clockwise direction, as indicated by the arrow 36 in Fig. 4, the rollers 27 will be rotated in a corresponding direction and wedged between the cam surfaces 30 and the stud 25 so as frictionally to lock the stud and rotatably driving member 12 to the stud and rotatably drive the latter into the cylinder block 35.

Continued rotation of the chuck in the direction indicated rotatably threads the stud 25 into the cylinder block until the driving member 12, or a part fixed against relative axial movement to the driving member 12, contacts the upper surface of the cylinder block 35. When the driving member 12, or a part fixed against relative axial movement with respect to the driving member 12, contacts the upper surface of the cylinder block 35, the stud 25 continues to be threaded into the cylinder block for a slight distance thus lowering the stud relative to the driving member 12 for a slight distance to effect a release of the pressure exerted by stud 25 on the adjustable plug 23 thus permitting the core member 17 to be lowered slightly with reference to the driving member by the expansion of spring 31. This releases the frictional gripping action of the rollers 27 upon the stud 25 so that the chuck may be elevated and removed from the stud.

It is preferred to make the part which contacts the upper surface of the cylinder block 35 adjustable axially with respect to the driving member 12. To this end, a gauge sleeve 40 is threaded to the lower or outer end of the driving member 12 and may be locked in the desired axially adjusted position by means of a locking collar 41. Where it is important that the gripping action upon the stud 25 is released without grooving, marring or scratching the upper surface of the cylinder block 35, a bushing 42 is journaled so as to rotate freely within the lower or outer end of the gauge sleeve 40. Ball bearings 43 may also be provided to aid permitting the bushing 42 to rotate freely relative to the gauge sleeve 40 and the driving member 12.

In the event that it is desired to remove studs 25 from a cylinder block 35, or the like, the chuck may be adjusted either by turning the plug 23 downwardly and locking it in position by means of a locking plug 24 or by backing the locking collar 41 upwardly and turning the gauge sleeve 40 axially onto the driving member 12 so as to change the released position of the chuck. The adapter 10 would then be rotated in the reverse direction from that employed in driving a stud into the cylinder block 35. The chuck may then be lowered over the stud so that the upper end of the stud again contacts the abutment plug 23 to elevate the core member 17 with reference to the driving member 12 and bring the roller 27 into contact with the tapered bore portion 18 of the driving member. Rotation of the driving member in a counter-clockwise direction, as viewed in Fig. 4, will then wedge the rollers 27 between the relatively stationary stud 25 and the oppositely sloping portions of the cam surfaces 30 so as frictionally to lock the stud with reference to the driving member. When the stud has been turned out of the cylinder block 35, it may be released from the chuck simply by pulling it downwardly with reference to the driving member 12.

Reference may now be had to Fig. 5 of the drawings, in which is illustrated a stud 45 of the type employed for connecting an aluminum cylinder head to an iron cylinder block. It will be noted that the unthreaded intermediate portion 46 is of a smaller diameter than the threaded end portions 47 of the stud so as to allow for the greater expansion of the aluminum in order that the end stud will not be bent or sheared off during operation of an internal combustion engine. The reduced portion 46 gives the stud greater flexibility so that it may be deflected without receiving a permanent set or breaking. To this end the slot 21 is made with the major dimension extending longitudinally of the core member so that the core member will have sufficient travel so that the rollers 27 may pass over the larger diameter threaded portion 47 and engage the unthreaded portion 46 of the stud 45. The chuck illustrated in Figs. 1 and 2 provides a body of sufficient length and provides for sufficient travel of the core member relative to the driving member so that it is possible for the chuck to pass over the larger diameter portion 47 and to grip the smaller diameter portion 46 to drive or remove the stud from a cylinder block, or the like. Different diametered studs may also be driven or withdrawn by the chuck.

Referring to Fig. 6, there is illustrated a chuck similar to that disclosed in Figs. 1 to 4, inclusive, with the exception that the gauge sleeve 50, corresponding to gauge sleeve 40 of the previously described embodiment, is not provided with a journaled contact element such as the bushing 42. The operation of this chuck construction is essentially the same as that of the previously described chuck except for the fact that the gauge sleeve 50 rotates relative to the cylinder block or other part into which the stud 25 is turned so that some marring or scratching may result. The gauge sleeve 50 is made adjustable axially with respect to the driving member 12 and may be fixed in adjusted position by means of a locking collar 41 in the same manner as previously described.

Reference may now be had to Fig. 7, which illustrates a chuck of essentially the same construction as previously described, but adapted to be employed in setting nuts with a power driven unit. The chuck is adapted for this use by adding an arbor 52 provided with a flange 53 and inserted into the chuck with the flange 53 positioned between the lower end of the core member 17 and the inner face of a gauge sleeve 60. The gauge sleeve 60 may be recessed as indicated at 51 for the reception of the flange 53, but is otherwise of essentially the same construction as the gauge sleeve 50 of the embodiment shown in Fig. 6. A suitable socket 54 may be detachably held on the end of the arbor 52 by means of a spring pressed detent 55 so that the socket may be employed for setting nuts. In the operation of the chuck, the drive shank 10 is connected to a suitable source of power so as to spin the chuck at the required rate of speed. A socket is then applied to the nut to be set and a slight downward pressure exerted upon the chuck causes the rollers 27 to engage the arbor 52 so as to rotate the nut to the desired setting. Upon release of the downward pressure on the nut, the rollers 27, urged downwardly by the spring 31 and the core member 17, release their frictional locking engagement on the arbor 52 and the chuck rotates freely about the arbor. The flange 53 abuts the lower end of the core member 17 to elevate the same and cause the rollers to wedge between cam surfaces 40 and the arbor 52 when a nut or bolt is engaged by the chuck and downward pressure is exerted upon the chuck. The flange 53 also prevents the arbor 52 from dropping out of the chuck when the arbor is not gripped by the rollers 27.

Reference may now be had to Fig. 8, which illustrates a further adaptation of the chuck. A straight shank milling cutter 56 provided with a shank or arbor 57, is illustrated as held within the chuck in much the same manner as previously described. In this embodiment, however, the gauge sleeve 70 is adapted to abut directly against the outer end of the core member 17 so as to lock the rollers 27 in frictional engagement with the shank 57. The straight shank milling cutter 56 is merely indicative of any desired tool, such as a drill, reamer, counterbore, tap, and the like, which may be driven in a like manner by the illustrated chuck construction. The rollers 27 may be released from frictionally engaging the shank of the tool held by the chuck by backing away the locking sleeve 41 and then unthreading the gauge sleeve 70 outwardly of the driving member 12 so that the spring pressed core member 17 may follow the gauge sleeve outwardly and release the pressure exerted by the rollers 27 on the shank of the tool to be operated.

As many changes could be made in the above constructions, and many apparently widely different embodiments of this invention could be had without departing from the scope thereof, it is intended that all matter contained in the above description or shown in the accompanying drawings, shall be interpreted as illustrative and not in a limiting sense.

What is claimed is:

1. In a stud operating chuck, a driving member provided with an outwardly flaring bore, a core member mounted for limited axial and rotary movements relative to said driving member, and tapered rollers carried by said core member and cooperable with said bore for causing frictional engagement between said rollers and the stud upon relative axial movement of said core and driving members in one direction and for causing release of said rollers from said stud upon relative axial movement of said core and driving members in the opposite direction, said flaring bore being provided with oppositely sloping cam surfaces for each roller for non-rotatively locking said driving member and stud upon rotation of said core member relative to said driving member in either direction.

2. In a stud operating chuck, a driving member provided with an outwardly flaring bore, a core member mounted for limited axial and rotary movements relative to said driving member, tapered rollers carried by said core member and cooperable with said bore for causing frictional engagement between said rollers and the stud upon relative axial movement of said core and driving members in one direction and for causing release of said rollers from said stud upon relative axial movement of said core and driving members in the opposite direction, said flaring bore being provided with oppositely sloping cam surfaces for each roller for non-rotatively locking said driving member and stud upon rotation of said core member relative to said driving member in either direction, and an adjustable abutment carried by said core member for engaging said stud.

3. In a stud operating chuck, a driving member provided with an outwardly flaring bore, a core member mounted for limited axial and rotary movements relative to said driving member, tapered rollers carried by said core member and cooperable with said bore for causing frictional engagement between said rollers and the stud upon relative axial movement of said core and driving member in one direction and for causing release of said rollers from said stud upon relative axial movement of said core and driving members in the opposite direction, said flaring bore being provided with oppositely sloping surfaces for each roller for non-rotatively locking said driving member and stud upon relative rotation in either direction of said core and driving members, and resilient means for normally urging said core member rotationally of said driving member toward a position such that the rollers are centrally disposed with respect to said oppositely sloping cam surfaces provided on said driving member for each roller.

4. In a stud operating chuck, a driving member provided with an outwardly flaring bore, a core member mounted for limited axial and rotary movements relative to said driving member, tapered rollers carried by said core member and cooperable with said bore for causing frictional engagement between said rollers and the stud upon relative axial movement of said core and driving member in one direction and for causing release of said rollers from said stud upon relative axial movement of said core and driving members in the opposite direction, said flaring bore being provided with oppositely sloping surfaces for each roller for non-rotatively locking said driving member and stud upon relative rotation in either direction of said core and driving members, and resilient means for normally urging said core member axially of said driving member to release frictional engagement of said rollers on said stud.

5. In an operating chuck for a member to be rotated, a driving member provided with an outwardly flaring bore, a core member mounted for limited axial and rotary movements relative to said driving member, and a plurality of rollers carried by said core member, the walls of the outwardly flaring bore of said driving member being provided with pairs of oppositely sloping cam surfaces for each roller for urging said rollers radially inwardly into engagement with the member to be rotated upon relative rotation of said driving member and core member in either of two opposite directions.

6. In an operating chuck for a member to be rotated, a driving member provided with an outwardly flaring bore, a core member mounted for limited axial and rotary movements relative to said driving member, a clutch mechanism associated with said core and driving members and comprising a plurality of tapered rollers carried by said core member and pairs of oppositely sloping cam surfaces provided on the walls of the outwardly flaring bore of said driving member for each roller, said bore and cam surfaces being formed and so arranged with respect to said rollers that relative axial movement between the member to be rotated and said driving member causes initial frictional engagement between the member to be rotated and the clutch mechanism and in the opposite axial direction to release said clutch mechanism, said clutch being actuated by relative rotation of said member to be rotated and said driving member in either direction to lock said clutch member into non-rotative engagement with the member to be rotated.

7. In an operating chuck for a member to be rotated, a driving member provided with an outwardly flaring bore and having oppositely inclined cam surfaces formed on the walls of said bore, a core member mounted for limited axial and rotary movements relative to said driving member, a clutch mechanism associated with said core and driving members and including means actuated by relative axial movement of the member to be rotated and the driving member in one direction for causing initial frictional engagement between the clutch mechanism and the member to be rotated, said means being actuated by relative rotation of said member to be rotated and said driving member so as to non-rotatively lock said clutch mechanism into engagement with said member to be rotated upon relative rotation of the member to be rotated and the driving member in either rotary direction, said means being actuated by relative axial movement of the member to be rotated and said driving member in the direction opposite to the first named axial direction for releasing said clutch mechanism from frictional engagement with the member to be rotated.

8. In a stud operating chuck, a driving member provided with an outwardly flaring bore, a core member mounted for limited axial and rotary movements relative to said driving member, and tapered rollers carried by said core member and cooperable with said bore for causing frictional engagement between said rollers and the stud upon relative axial movement of said core and driving members in one direction and for causing release of said rollers from said stud upon relative axial movement of said core and driving members in the opposite direction, said flaring bore being provided with a cam surface for each roller and arranged in eccentric relation with respect to the axis of said driving member for non-rotatively locking said driving member and stud upon rotation of said driving member in one direction relative to said core member.

9. In an operating chuck for a member to be rotated, a driving member provided with an outwardly flaring bore, a core member mounted for limited axial and rotary movements relative to said driving member, and a plurality of rollers carried by said core member, the walls of the outwardly flaring bore of said driving member being provided with a cam surface for each roller and arranged in eccentric relation with respect to the axis of said driving member for urging said rollers radially inwardly into engagement with the member to be rotated upon rotation of the driving member in one direction relative to said core member.

10. In an automatic chuck, a driving casing, a driven element slidable and rotatable within the casing, gripping means including a roll caged by but rotatable and radially movable in the driven element, said driven element also having a socket therein accessible from outside through an opening in the casing and intersecting the path of radial movement of the roll, a cam carried by the casing and encircling the roll-caging portion of the driven element for radially actuating the roll, said cam having surfaces inclined both circumferentially and axially, the axial inclination of the cam being such that rearward movement of the casing with respect to the socketed portion of the driven element tends to free the roll, and spring means exerting torque and thrust on said driven element to urge it toward such position relatively to the cam as to free the roll for outward movement.

11. In a device of the character described, a combined casing and driving element having a substantially cylindrical chamber therein, a driven element within said casing element and limitedly movable both rotatively and longitudinally in said chamber, means yieldably urging said driven element toward a predetermined longitudinal and angular position with respect to the other, said driven element having a work receiving socket therein accessible from outside through an aligned opening in the casing, clutching means also within the casing and movable into and out of the socket in the driven element, and means including a cam carried by said casing and having surfaces inclined circumferentially and outwardly flaring for moving said clutching means into the socket upon movement of the driven element relatively to the casing under the influence of work forced into the socket.

ARTHUR I. KIRKLAND.